Sept. 1, 1970 H. L. WHEATON, JR 3,526,840

STEERING AND TIMING CIRCUIT

Filed Jan. 29, 1968

INVENTOR
H.L.WHEATON

BY W. G. Dosse' JR.
ATTORNEY

United States Patent Office 3,526,840
Patented Sept. 1, 1970

3,526,840

STEERING AND TIMING CIRCUIT

Harry L. Wheaton, Jr., Glen Ellyn, Ill., assignor to Western Electric Company, Incorporated, New York, N.Y., a corporation of New York Filed Jan. 29, 1968, Ser. No. 701,167
Int. Cl. H03k 17/02, 19/00
U.S. Cl. 328—97 5 Claims

ABSTRACT OF THE DISCLOSURE

A signal steering and timing circuit for normally conducting an input signal to the next stage in a sequence of like circuits. In response to a bias signal, the normal path is disabled and the input signal is delivered to a time delay circuit which, after a predetermined delay, issues a new signal to the next stage.

BACKGROUND OF THE INVENTION

Field of the invention

This invention relates to electronic circuits and more particularly to electronic logic for signal steering and timing.

Description of the prior art

In electronic systems, it is often desirable to obtain signals at various times on various conductors. There are electronic counters and mechanical timing devices for this purpose, but these prior timers are relatively inflexible and require considerable time, effort, and expense to change.

Therefore, it is an object of the present invention to provide a distributed timer that can be changed readily.

It is another object of the present invention to disable or enable a timer stage quickly and easily.

Still another object of the present invention is to steer a signal alternatively to a first utilization device or a second utilization device.

SUMMARY OF THE INVENTION

In accordance with the present invention, an input signal is normally conducted to a first utilization device; in response to a bias signal, the input signal is prevented from being conducted to the first utilization device but is conducted instead to a second utilization device which conducts another signal to the first utilization device.

BRIEF DESCRIPTION OF THE DRAWING

Other objects, advantages and novel aspects of the invention will become apparent upon consideration of the following detailed description, when considered in conjunction with the accompanying drawing in which.

DETAILED DESCRIPTION

Figure 1:
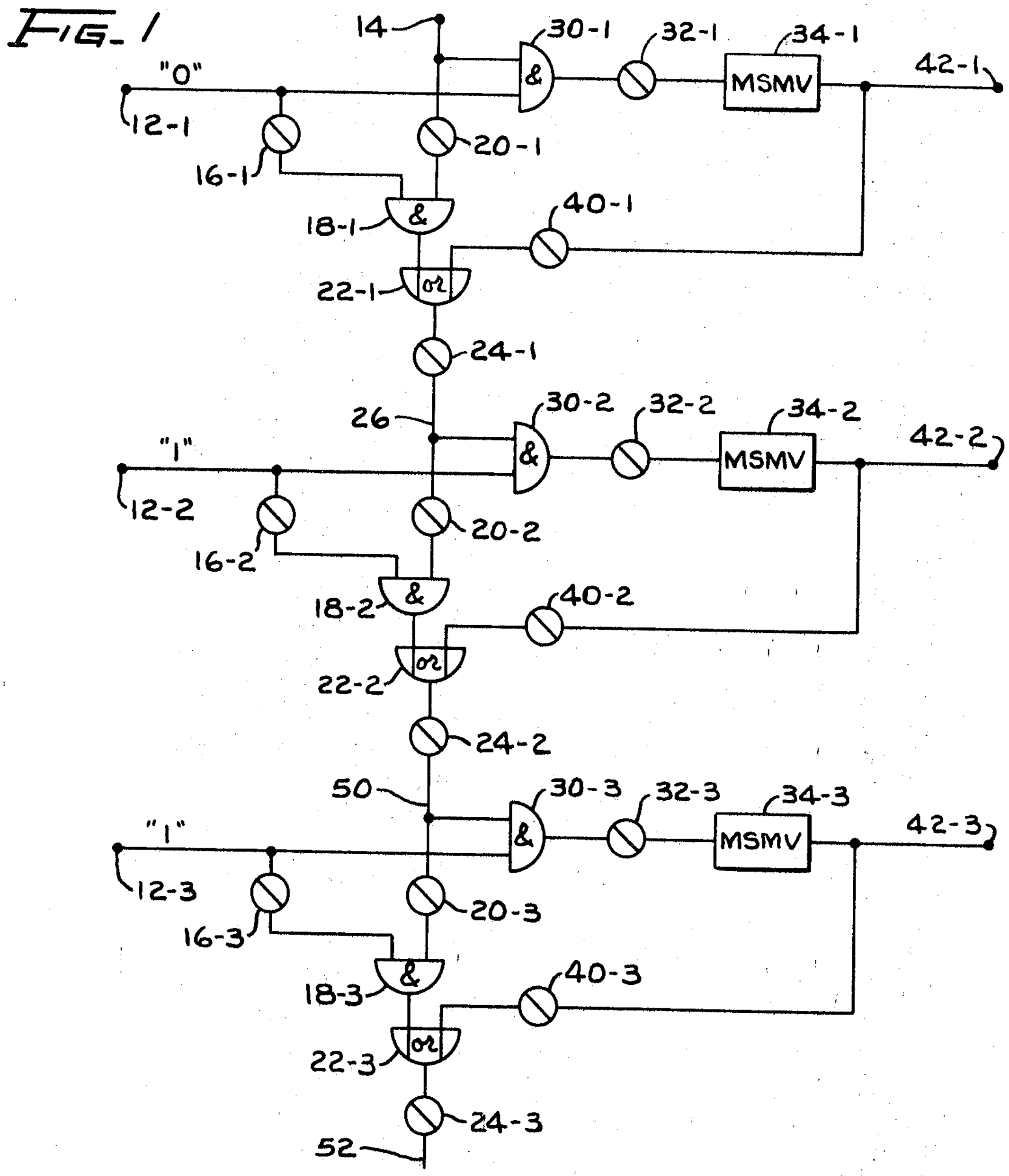
FIG. 1 shows three stages of a timer wherein each stage is a signal steering circuit according to the present invention.

Referring now to the drawing and more particularly to the first one of the three identical stages of the circuit of FIG. 1, there is a bias input terminal 12–1 that is normally maintained in the "0" state. The bias-level signals received at the bias terminal 12–1 are set prior to the start of a cycle of operation of the circuit and are changed only during any interval between cycles. A trigger input terminal 14 is connected to a timer initiating device or a prior stage (not shown) of the circuit and is normally maintained at a voltage or current level representing the binary "1" state. The binary "0" and "1" states are signals that may be any arbitrary or predetermined voltage or current level commensurate with the other parameters of the circuit.

A bias inverter 16–1, connected to the bias terminal 12–1, normally delivers a "1" state bias signal to one of the inputs of an AND-gate 18–1 in response to the "0" state signal received from the bias terminal 12–1. A trigger inverter 20–1 connected to the trigger terminal 14 normally delivers a voltage representing the binary "0" state to the other input of the AND-gate 18–1 in response to the "1" signal from the trigger terminal 14. Since at least one of its inputs normally receives a "0" state signal, the AND-gate 18–1 normally delivers a "0" signal to an OR-gate 22–1 which normally delivers a "0" signal to an output inverter 24–1 that in turn inverts this "0" state signal to a "1" state signal which duplicates the "1" state signal at the trigger terminal 14 on an interconnection conductor 26 that joins the first and second stages.

The "0" state bias signal received at the bias terminal 12–1 is also applied to one of the inputs of a detour AND-gate 30–1, thereby causing the AND-gate 30–1 normally to issue a "0" signal despite the presence on its other input of the "1" state signal from the trigger terminal 14. Therefore, so long as the bias terminal 12–1 receives a "0" state signal, the detour AND-gate 30–1 is "blind" to any signal level or signal transition appearing at the trigger terminal 14.

When the signal received at the trigger terminal 14 changes from the "1" state to the "0" state, it causes the trigger inverter 20–1 to deliver a "1" state signal to the AND-gate 18–1 which is already receiving a "1" state signal at its other input from the bias inverter 16–1. Receipt of "1" state signals at both of its inputs causes the AND-gate 18–1 to change its output from the "0" state to the "1" state, and this "1" signal is delivered to the OR-gate 22–1. The OR-gate 22–1 then delivers this "1" state signal to the output inverter 24–1 which inverts it to a "0" state signal, duplicating the "0" state signal at the trigger terminal 14, and this "0" state signal is delivered to the interconnection conductor 26. Therefore, whenever the bias terminal 12–1 is held in the "0" state, the signals received at the trigger terminal 14 are sent undelayed to the succeeding or second stage of the circuit. This second stage of the circuit can then utilize the signal received at the trigger terminal 14.

In the event that the bias terminal 12–1 is maintained in the "1" state instead of the "0" state, the bias inverter 16–1 delivers a "0" state signal to its associated input of the AND-gate 18–1. Therefore, signals from the trigger inverter 20–1 are prevented from appearing at the output of the AND-gate 18–1. However, the "1" state signal present at the bias terminal 12–1 enables the detour AND-gate 30–1 to deliver an output which duplicates the input received at the trigger terminal 14. Therefore, when the bias terminal 12–1 is maintained in the "1" state, the normal "1" signal existing at the trigger terminal 14 causes th detour AND-gate 30–1 normally to deliver a "1" state signal to a detour inverter 32–1 which delivers a "0" state signal to a monostable multivibrator 34–1 which can then utilize this trigger signal. The construction of the monostable multivibrator 34–1 is such that it is triggered from its stable state to its quasistable state by a transition from the "1" state to the "0" state received from the detour inverter 32–1. The output of the monostable multivibrator 34–1 is normally maintained in the "1" state so long as the monostable multivibrator 34–1 remains in its stable state. This causes an inverter 40–1 normally to deliver a "0" state signal to the OR-gate 22–1. Since both inputs of the OR-gate 22–1 are normally maintained in the "0" state, its output is also normally "0". Therefore, the output of the inverter 24–1 to the interconnection conductor 26 is still normally a "1" signal, duplicating the normal "1" state signal received at the trigger terminal 14.

When the trigger terminal 14 changes from the "1" state to the "0" state, the output of the detour AND-gate 30–1 also changes to the "0" state. Therefore, the output of the detour inverter 32–1 changes to the "1" state, thereby preparing the monostable multivibrator 34–1 to be triggered to its quasistable state as soon as the signal received at the trigger terminal 14 changes back from the "0" state to its normal "1" state. However, so long as a "0" signal is received at the trigger terminal 14, the monostable multivibrator 34–1 remains in its stable state; and the interconnection conductor 26 still carries a "1" state signal.

When the signal received at the trigger terminal 14 does change from "0" to "1," the detour AND-gate 30–1 again delivers a "1" state signal to the detour inverter 32–1 which changes its input to the monostable multivibrator 34–1 from the "1" state to the "0" state. This causes the monostable multivibrator 34–1 to assume its quasistable state during which time it delivers a "0" signal to the inverter 40–1 as well as to an output terminal 42–1 which can be connected to any device requiring a distributed timing signal. When the inverter 40–1 receives a "0" signal at its input, it delivers a "1" signal to the OR-gate 22–1 which in turn delivers a "1" signal to the output inverter 24–1. The inverter 24–1 then changes its output to the interconnection conductor 26 from "1" to "0." It can be seen that the signal appearing at the interconnection conductor does not change from the normal "1" state to the "0" state when the trigger input changes from the "1" state to "0" state but remains in the "1" state and changes to the "0" state only when the signal delivered at the trigger terminal 14 reverts from the "0" state to the "1" state.

After an arbitrary interval determined by the construction and adjustment of its internal circuitry, the monostable multivibrator 34–1 reverts to its stable state and again delivers a "1" state signal to the inverter 40–1 and to the output terminal 42–1. When the inverter 40–1 receives the "1" state signal from the monostable multivibrator 34–1 it again delivers a "0" state signal to the OR-gate 22–1 which therefore delivers a "0" state signal to the output inverter 24–1, causing the output inverter 24–1 to again deliver the normal "1" state signal to the interconnection conductor 26 and thence to the next stage of the timer for utilization thereby.

As a specific example of the operation of a circuit according to the present invention, the three-stage timing and signal steering circuit of FIG. 1 is arranged with a "0" signal at the bias terminals 12–1 and with "1" signals at the bias terminals 12–2 and 12–3. This will cause a trigger signal to pass unimpeded through the first stage but to be delayed through the second and third stages.

The "0" signal from the bias terminal 12–1 assures that the output from the detour AND-gate 30–1 is always in the "0" state no matter what signal is received at the trigger terminal 14. The "0" state of the bias terminal 12–1 also causes the bias inverter 16–1 to deliver a "1" signal to the AND-gate 18–1 thereby enabling the output of the AND-gate 18–1 to duplicate any signal delivered to its other input from the trigger inverter 20–1. As a consequence of a "0" state existing on bias terminal 12–1, the interconnection conductor 26 duplicates any signal received at the trigger terminal 14.

Since the bias terminal 12–2 of the second stage is in the "1" state, the bias inverter 16–2 delivers a "0" state signal to the AND-gate 18–2 assuring that its output remains in the "0" state irrespective of signals received at its other input. The "1" signal at bias terminal 12–2 also enables the detour AND-gate 30–2 to duplicate at its output any signal received at its other input from the interconnection conductor 26.

Similarly, the "1" state signal at the bias terminal 12–3 of the third stage causes the AND-gate 18–3 to block any signal received over the interconnection conductor 50 that couples the second stage to the third stage, and also enables the detour AND-gate 30–3 to respond to the input signals received over the interconnection conductor 50 from the output inverter 24–2 of the second stage.

Figure 2:
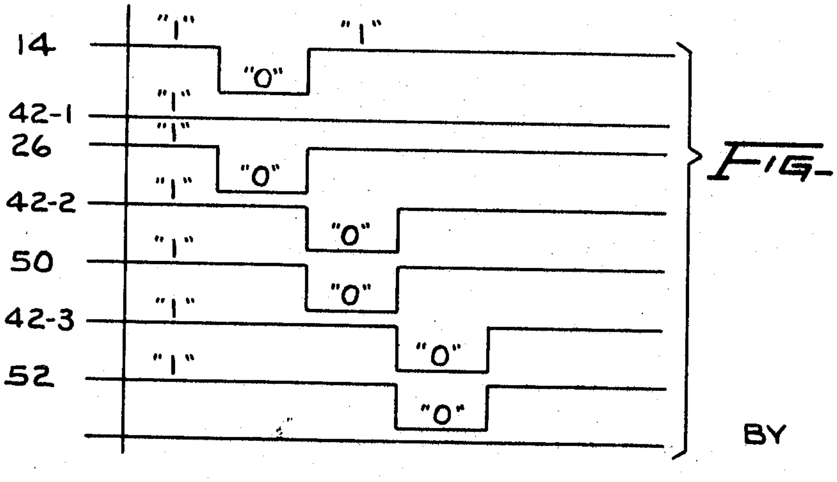
FIG. 2 is a timing diagram of the circuit of FIG. 1 having predetermined bias signals applied thereto.

Referring now to FIGS. 1 and 2, when the signal received on the trigger terminal 14 changes from the "1" state to the "0" state, the output of the trigger inverter 20–1 changes from the "0" state to the "1" state causing the output of the AND-gate 18–1 to send a "1" signal through the OR-gate 22–1. This "1" signal causes the first stage output inverter 24–1 to deliver a "0" signal on interconnection conductor 26, that duplicates the "0" state signal at the trigger terminal 14. Since there was no change in the state of the output detour AND-gate 30–1, the output from the monostable multivibrator 34–1 remains in the "1" state and continues to deliver this "1" state signal to the output terminal 42–1. Therefore, the output terminal 42–1 receives no distributed timing signal.

The "0" signal now received over the interconnection conductor 26 causes the second stage detour AND-gate 30–2 to deliver a "0" state output to the detour inverter 32–2. The resultant "1" state signal applied by the detour inverter 32–2 to the input of the monostable multivibrator 34–2 prepares this multivibrator for subsequent triggering to its quasistable state. However, as long as the interconnection conductor 26 delivers a "0" state signal to the detour AND-gate 30–1, the monostable multivibrator remains in its stable state and continues to deliver a "1" state signal to the output terminal 42–2.

When the signal received at the trigger terminal 14 changes from the "0" state to the "1" state, the interconnection conductor 26 also reverts from the "0" state to the "1" state causing the output of the detour AND-gate 30–2 to deliver a "1" signal to the detour inverter 32–2. As soon as its input changes from the "0" state to the "1" state, the detour inverter 32–2 changes the signal delivered to the monostable multivibrtaor 34–2 from the "1" state to the "0" state, causing the monostable multivibrator 34–2 to assume its quasistable state. As long as the monostable multivibrator 34–2 remains in its quasistable state, it delivers a "0" output signal to the output terminal 42–2. This "0" state output signal is also delivered to the inverter 40–2 which thereupon delivers a "1" signal through the OR-gate 22–2 to the second stage output inverter 24–2. This "1" signal from the inverter 40–2 causes the output inverter 24–2 to deliver a "0" state signal on the interconnection conductor 50 that couples the second and third stages. It can be seen that the signal existing at the output terminal 42–2 is duplicated at the interconnection conductor 50 if a "1" state signal is received at the bias termianl 12–2.

The "0" state signal received by the third stage over the interconnection conductor 50 causes the output of the third stage detour AND-gate 30–3 to assume the "0" state. This "0" state causes the detour inverter 32–3 to deliver a "1" state signal to the input of the monostable multivibrator 34–3, preparing it for subsequent triggering to its quasistable state.

After an interval determined by the internal timing circuitry of the monostable multivibrator 34–2, this multivibrator reverts to its stable state and sends a "1" state signal to the output terminal 42–2 and to the interconnection conductor 50. The "1" state signal on interconnection conductor 50 causes the output of the detour inverter 32–3 to send a "0" state signal to the input of the monostable multivibrator 34–3, triggering it to its quasistable state in which it delivers a "0" state signal to its associated output terminal 42–3 as well as to another interconnection conductor 52 (via inverters 40–3 and 24–3 as well as the OR-gate 22–3) which connects the third stage with subsequent stages (not shown). After an interval determined by the interval timing circuitry of the monostable multivibrator 34–3, it again assumes its stable state and delivers a "1" signal to its associated output terminal 42–3 as well as its interconnection conductor 52.

It can be seen that the operation of each stage of the circuit of FIG. 1 is controlled by the state of the binary signals received at its bias terminal 12. These bias signals can easily be controlled manually by switches or by separate electronic circuitry (not shown). In fact the control signals existing at the bias terminals 12 can be changed for each trigger signal received from the trigger input 14.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A circuit for steering an input signal alternatively to a first utilization device or to a second utilization device in response to a predetermined level of bias signal comprising:

means for normally conducting the input signal to the first utilization device;

means responsive to the presence of the predetermined level of bias signal for disabling said normally conducting means and for conducting the input signal to the second utilization device; and means responsive to the operation of the second utilization device for sending another signal to the first utilization device.

2. A circuit according to claim 1 wherein said normally-conducting means comprises a first AND-gate having at least two inputs and an output, with one input thereof normally biased to cause said first AND-gate to conduct the input signal from the other of its inputs to its output; and an OR-gate having at least one input and an output, with one input thereof connected to the output of said first AND-gate and the output of the OR-gate connected to the first utilization device.

3. A circuit according to claim 1 wherein the second utilization device comprises a time delay means for delivering the other signal to the first utilization device a predetermined time after delivery of the input signal to the second utilization device.

4. A circuit according to claim 2 wherein said disabling and conducting means comprises:

means responsive to the presence of a bias signal for removing the normal bias from said first AND-gate;

a second AND-gate having at least two inputs and an output that is connected to the second utilization device, with one input thereof connected to receive the input signal and the other input thereof normally biased to block passage of the input signal; and means responsive to receipt of the bias signal for removing the normal bias from said second AND-gate and for enabling said second AND-gate for conducting the input signal to the second utilization device.

5. A circuit according to claim 2 wherein said sending means comprises: means for delivering the other signal from the second utilization device to another input of said OR-gate.

References Cited

UNITED STATES PATENTS

| | | | |
|---|---|---|---|
| 2,866,092 | 12/1958 | Raynsford | 328—94 X |
| 3,437,940 | 4/1969 | Tarczy-Hornoch | 307—233 X |

DONALD D. FORRER, Primary Examiner

S. D. MILLER, Assistant Examiner

U.S. Cl. X.R.

328—55, 94, 92; 307—218, 241, 208